United States Patent [19]

Mas

[11] 4,110,649
[45] Aug. 29, 1978

[54] VARIABLE SPEED DC MOTOR

[75] Inventor: Joseph A. Mas, Woodbury, N.Y.

[73] Assignee: Electric Vehicle Corporation of America, New York, N.Y.

[21] Appl. No.: 744,074

[22] Filed: Nov. 22, 1976

[51] Int. Cl.² .............................................. H02K 1/12
[52] U.S. Cl. .................................... 310/191; 310/154; 310/209; 318/538
[58] Field of Search ............... 318/243, 360, 538, 539; 310/154, 191, 209, 268, 190

[56] References Cited

U.S. PATENT DOCUMENTS

| 3,077,548 | 2/1963 | Moressee et al. | 310/191 X |
| 3,315,106 | 4/1967 | Reynst | 310/209 X |
| 3,330,976 | 7/1967 | Brown | 310/191 |
| 3,360,667 | 12/1967 | Gordon, Jr. | 310/154 |

Primary Examiner—Donovan F. Duggan
Attorney, Agent, or Firm—Edward F. Levy

[57] ABSTRACT

A variable speed DC motor contained within a housing having bearing openings at each end, an armature disposed in the housing and pivoted in the bearing openings, the improvement being a first cylindrical field shell surrounding the armature and having a pair of oppositely disposed field pole segments mounted the shell and facing the armature. There is a second cylindrical field shell surrounding the armature and also having a pair of oppositely disposed field pole segments mounted facing the armature. The motor also has a gear means coupled to each of the shells for angularly displacing said first and second shells opposite to each other with respect to the neutral axis of the motor.

7 Claims, 4 Drawing Figures

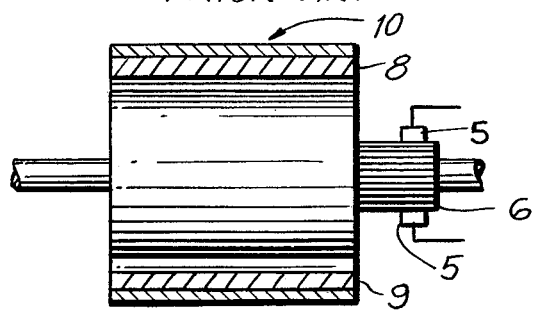
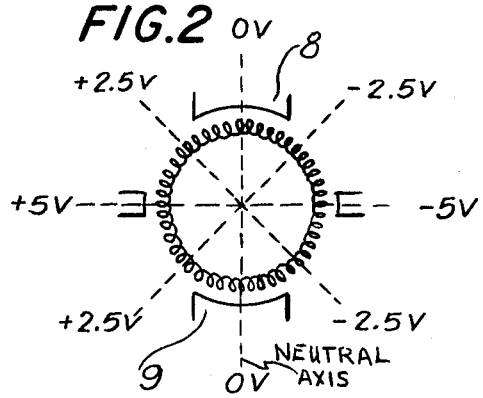
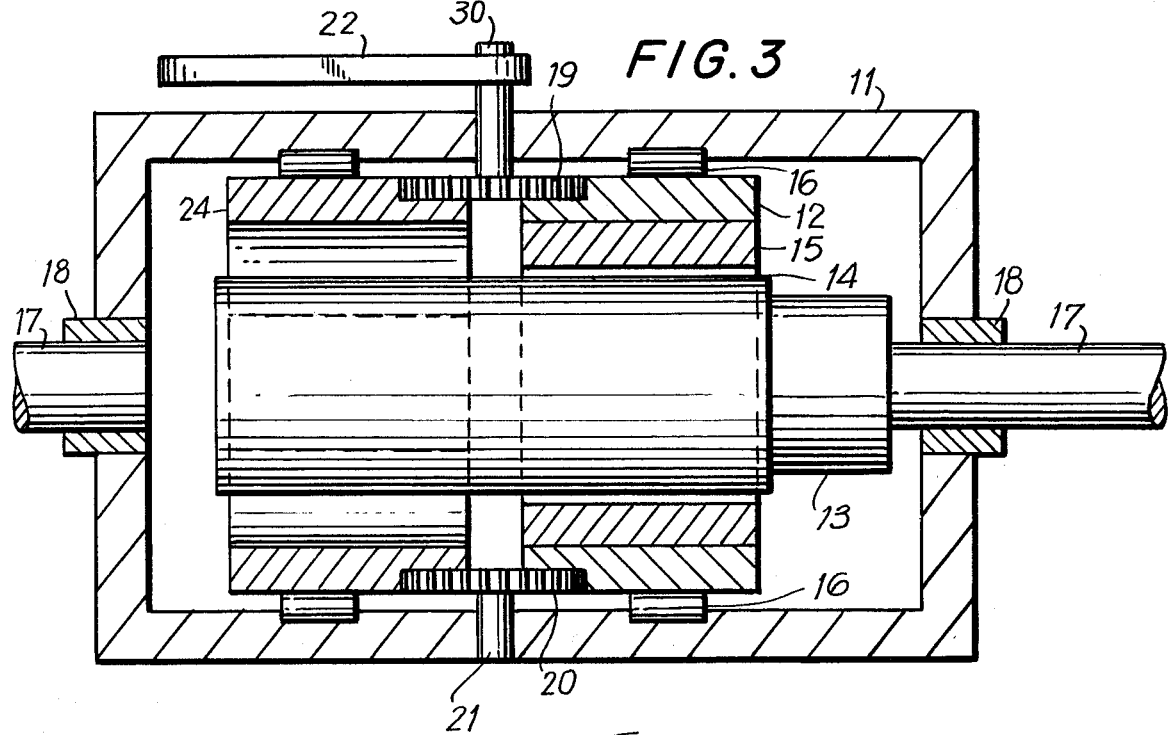
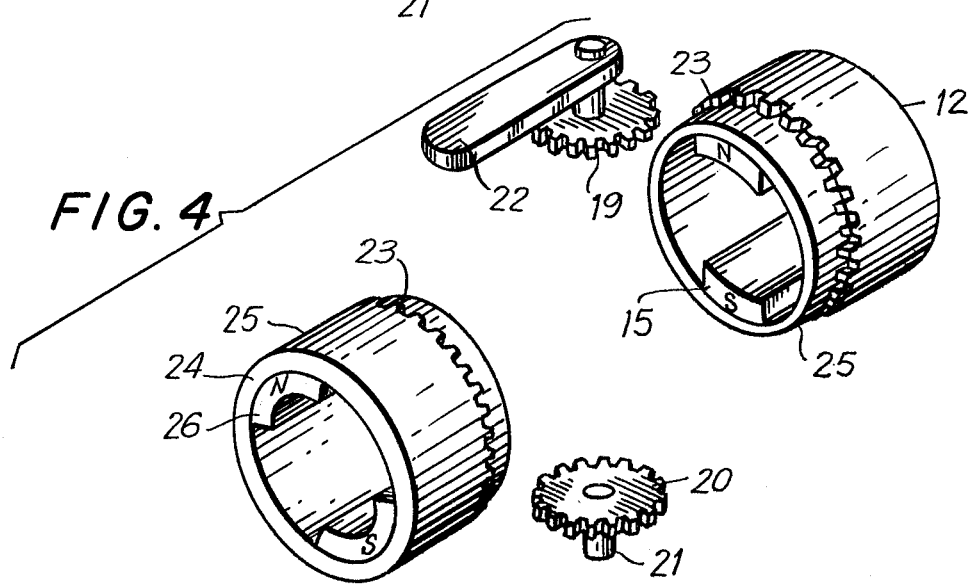

VARIABLE SPEED DC MOTOR

This invention relates to a high efficiency variable speed DC motor.

More specifically, this invention relates to a high efficiency DC motor which contains field structures which can be displaced in opposite directions in order to change the speed of the motor for the same input potential.

In designing motors for use in electric vehicles, such as electric cars, it is desirable to have a motor that can change in speed for the same input potential applied without excessive energy loss.

The series motor and the shunt motor are generally the two types of DC motors that are available for electric transportation. The series motor has been considered the best traction motor since the beginning of electric transportation. The series motor is well known, has its field in series with the armature so that the field strength varies with the motor current. Its main feature is that it can provide a high torque at low speeds, but it has several serious disadvantages. It needs a variable voltage source to provide low speed low torque operation. In electric cars, this is provided by series resistors, series parallel battery connections or solid state chopper circuits. These are very inefficient and cumbersome components to use for electric vehicles. Moreover, the series motor has no dynamic braking qualities so that when the vehicle's inertia and speed exceeds the motor's speed, the vehicle will free-wheel. In other words, the series wound motor cannot accept the car's stored kinetic energy to put this energy back into the battery.

On the other hand, the shunt motor with a field control is a better choice for electric vehicles since it has dynamic braking. Therefore, the motor will become a generator when the speed of the vehicle exceeds the desired value of motor current. By controlling the field current of a shunt motor, it is possible to achieve, within limits, a variable speed at constant input voltage.

There are basic limitations to controlling the field current of a shunt motor. Due to air resistance, the power requirements of an electric vehicle increase rapidly with speed. The motor is, therefore, required to give its best performance at the upper range of its speed. Since the speed is increased by weakening the field, this means that the motor must run efficiently at maximum armature current and minimum field. Unfortunately, the high armature current distorts the weak pole field and may even reverse it. To reduce this effect, commutating interpoles are generally used in these motors. Interpoles, however, cannot keep up with the massive armature field at the higher speeds. Thus, the speed range of these motors is limited to approximately four to one. Above this speed, there is serious sparking occurring at the commutator.

In order to overcome the disadvantages and limitations of shunt field motors as variable speed motors, several solutions were attempted. In the Stow motor, there is a crank with gears to pull the pole pieces away from the armature and increase the speed. This solves the commutation problem since as the air gaps are increased, both the pole field and armature reaction field are decreased. However, the forces needed to separate the pole pieces away from the armature during operation are excessively high so that quick and continuous field control cannot be performed, a requirement which is necessary for electric vehicles.

The same problem is true for the Lincoln motor, wherein a crank is used to move the rotating armature in and out of the field. The Lincoln motor has found applications where the speed does not require rapid and continuous change, such as in a lathe.

Thus far, two means of changing the speed of a DC motor have been described: varying the impressed voltage, or varying the field flux. It is well known that there is a third, though not desirable method. This third method consists of shifting the angular relationship between the line of the brushes and the line of the field flux. Normally, the brush line is at right angles to the flux line. At this angle, the armature induced voltage picked up by the brushes is at a maximum which means that the speed for any given impressed voltage is at a minimum. Also, at this angle, commutation is ideal. The armature coils being shorted by the brushes have zero induced voltage since the flux at right angles to the field is zero. If the angle is now reduced by shifting the flux line with respect to the brush line, speed will increase, since the induced voltage picked up by the brushes is decreased. (At zero angle, the induced voltage picked up by the brushes is zero and the speed would be infinite.)

Except for small changes, the third method of speed control is not practical. The reason for this is that as the angle is reduced, the induced voltage in the coils being shorted by the brushes is no longer zero, and will increase as the angle is decreased. This leads to serious sparking at the brushes and the eventual destruction of the brushes and the commutator. The motor efficiency is also impaired due to the short-circuit losses in the armature coils. A patent issued to Moresee describes a motor with a disc-type armature and a permanent magnet field consisting of two concentric sections, one stationary, and one movable. It is clear that as the movable section is displaced, the effective flux line is also displaced. This motor then belongs in the third group and subject to the limitations discussed above.

The present invention overcomes all of the disadvantages of the prior art DC variable speed motors by providing a DC motor which has no field or interpole losses and commutation problems. The motor of the present invention may use permanent magnets in the magnetic field. These magnets are preferably made of a ceramic containing barium ferrite or strontium ferrite. The permanent magnets of this type are shaped as segments of arcs over the surface of the motor armature. Generally, permanent magnet motors are considered constant speed motors since their speed varies very little from no load to full load conditions and is a function of the input voltage. An important and basic difference between the permanent magnet motor and its shunt motor field wound counterpart is the reluctance of the magnetic circuit. In the shunt wound motor, this reluctance is low since it is mainly due to the air gap clearance between the armature and the field. In the permanent magnet motor, it is very high since the permeability of the magnetic material is almost equal to that of air. As a result, the armature reaction field does not affect the field flux during operation. Consequently, the neutral plane of the motor is not appreciably changed by the armature current. The permanent magnet motor thus does not need brush shift or interpoles to overcome armature reaction. However, any attempt to vary the pemanent magnet field by pulling out the magnets, such as in the Stow motor, or pulling the armature out, such as in the Lincoln motor, or shifting the field angle, such as in the Moresee motor, would encounter the problems already discussed.

In the present invention, at least two constant-reluctance-constant-density but axially displaced magnetic fields are used. The armature will respond to the vector sum of these two identical fields even though the fields are constant and independent of each other. Their effect on the armature conductors is sequential and vectorially additive. These two fields are free to rotate but only in counterrotation with respect to each other. The counter-torque of the armature exerted on both fields is thus neutralized and very little force is required to change speed.

The armature induced voltage at the brush neutral plane as a result of these fields is a function of the total effective flux Ft, as follows:

$$Ft = F_1 \cos \phi + F_2 \cos \phi$$

In the above, $F_1$ and $F_2$ are two fields and $\phi$ is the angular displacement each field received. In the permanent magnet motor of the present invention, the neutral plane flux is at right angles to the total field flux Ft so that the neutral plane flux $F_o$ is $F_o = F_1 \sin \phi - F_2 \sin \phi = 0$.

We can see that the neutral plane flux will be zero for all values of Ft as long as the two fields are equal. The two permanent magnet fields which counterrotate with respect to each other are coupled to an idler gear and a driven gear. Thus, when the driven gear is rotated, both shells will rotate opposite with respect to each other at an equal angular displacement over the armature.

It is, therefore, an object according to the present invention to provide a high efficiency variable speed DC motor which has at least two counterrotating permanent magnet fields.

It is another object according to the present invention to provide a high efficiency DC motor which is simple in design, easy to manufacture and reliable in operation.

Other objects and features of the present invention will become apparent from the following detailed description considered in connection with the accompanying drawing which discloses an embodiment of the invention. It is to be understood, however, that the drawing is designed for the purpose of illustration only and not as a definition of the limits of the invention.

In the drawing wherein similar reference characters denote similar elements throughout the several views:

FIG. 1 is a cross-sectional view showing the armature and field for a prior art DC permanent magnet motor;

FIG. 2 is a schematic representation showing the field and brush relationship for a conventional two pole DC motor;

FIG. 3 is a cross-sectional view of the DC motor according to the present invention; and FIG. 4 is an exploded view of the field winding and control of the motor of FIG. 3.

Referring to FIG. 1, there is shown a prior art motor 10 having field poles 8 and 9 disposed over armature 7. The field is generally fixed with respect to the brush line and at right angle to it as shown in FIG. 2.

FIG. 2 is a schematic representation of the motor and the relative voltages produced at the brushes at various angles. If the brushes lie along the vertical plane, with field poles 8 and 9, there is no induced voltage and the speed should be infinite. Coils shorted by the brushes would have maximum induced voltage resulting in maximum sparking. If the brushes lie along the horizontal plane, the induced voltage will be at a maximum, the speed minimum, and commutation ideal due to zero flux at the shorted coils.

FIG. 3 is a cross-sectional view showing the improvements of the invention. The motor includes a housing 11 which is preferably cylindrical in shape. At each end there is a bushing or bearing 18 for supporting the shaft 17 of the armature. Armature 14 includes a commutator 13 at one end for applying DC power to the armature coils. The brushes have been left off the circuit for simplicity. Surrounding the armature are two cylindrical shells 12 and 24, each containing a pair of permanent magnet pole segments 15 and 26, respectively. Armature shells 12 and 24 are designed to float on bushings or rollers 16 within housing 11, so that they can be counterrotated.

The diameters of each of shells 12 and 24 are reduced adjacent to their interface to a smaller diameter 25 and 23 so as to define a circular gear shoulder 23 having teeth which correspond to the teeth of a driven gear 19. Driven gear 19 is mounted on a shaft 30 which is connected to one end of handle 22. Shaft 30 is pivoted within housing 11 of the motor. At the diagonally opposite side of housing 11 is also a hole to receive a shaft 21 which contains idler gear 20. The teeth of idler gear 20 are also engaged to teeth 23 on shells 12 and 24. Gears 19 and 20 are prefereably the same size and pitch so that when handle 22 is rotated, shells 12 and 24 will pivot on bearings 16 through equal and opposite displacements from the neutral axis of the apparatus. The electromechanical forces acting on both shells will cancel each other as the shells are displaced through equal angles, so that it is necessary to only overcome the frictional forces of the counterrotating gear within housing 11.

Shells 12 and 24 may be constrained from separting away from gears 19 and 20 by adding conventional clamp during their displacement. For example, the shells could be slotted and bearings 16 disposed in the slots to prevent any axial displacement away from the gears. Likewise, armature 14 may be constrained from axial displacement by extending bearings 18 in housing 11 (as is well known in the art) against the commutator and armature.

The outer housing is preferably constructed of a light non-magnetic alloy. Field pole pairs 15 and 26 which are secured within shells 12 and 24 are preferably constructed of a ceramic permanent magnet material, such as barium ferrite or strontium ferrite. Shells 12 and 24 are preferably constructed of a para-magnetic material, such as iron in order to provide efficient return paths for the magnets.

Speed control is achieved by rotating handle 22 or may be accomplished by rotating one of the field shells through a slot in the housing (not shown). The other shell will then counterrotate since it is coupled by idler gear 20. Maximum speed occurs when the angular rotation of field segments 15 and 26 approaches 90°. At this point, the net intergrated flux in the armature approaches zero, and the armature has to spin the fastest to create the counter emf. In order to prevent excessive speeds, a convenient stop just short of 90° can be provided at any desired point to prevent destruction of the motor. If desired, a third magnetic field can be added. This field would preferably be stationary and in the center between the two counterrotating fields. The purpose of the third field would be to provide a minimum high speed field when the angular rotation is 90°. Since the neutral plane flux is always zero and always coincides with the brush plane, it is evident that commutation is ideal at all speeds.

As can be seen from the above, the motor of the present invention provides a continuous speed control over a range of at least 10 to 1. The horsepower output remains essentially constant over this range. (Horsepower output is proportional to the motor current times the RPM.) The motor of the invention is thus the equivalent of a conventional motor with an infinitely variable gear train. Moreover, the variation in speed with constant horsepower takes place at high efficiency since there are no field or interpole losses and no commutation problems. For electrical vehicle use, the motor of the present invention could thus provide a continuous speed control from six miles per hour to 60 miles per hour at full battery voltage without power-wasting voltage controllers or resistors. Lever 22 would preferably be connected to the accelerator pedal of the vehicle so that speeds between 6 miles per hour and 60 miles per hour can be controlled. For speeds less than 6 miles per hour, a low voltage tap can be provided in the battery.

While the above invention has been described with respect to a permanent magnet field motor, it is obvious that the counterrotating fields could also be electromagnetic fields.

While only a single embodiment of the present invention has been shown and described, it will be obvious that many changes and modifications can be made without departing from the spirit and scope of the invention.

What is claimed is:

1. A variable speed DC motor contained within a housing having bearing openings at each end, an armature disposed in the housing and pivoted in the bearing openings, the improvement comprising:
    first cylindrical field shell means surrounding the armature and having at least a pair of oppositely disposed magnetic field pole segments mounted in said shell means facing the armature;
    second cylindrical field shell means surrounding the armature and having at least a pair of oppositely disposed magnetic field pole segments mounted in said shell means facing the armature;
    means mounting to each of said shell means for independent rotation within said housing and around said armature;
    gear means coupling said shell means for rotation of the latter in opposite directions, whereby to vary the angular spacing between the magnetic field pole segments of the first shell means and the magnetic field pole segments of the second shell means;
    and control means for selectively rotating said shell means, said control means having an actuating portion located outside of said motor housing for control of said shell means exteriorly of said motor.

2. The variable speed DC motor as recited in claim 1 wherein said gear means includes peripheral gears formed on the circumference of each of said shell means and facing each other, and at least one gear engaging and coupling said peripheral gears of each of said shell means, and in which said control means is coupled to said gear means for displacing the shell means in equal increments and in opposite directions.

3. The variable speed DC motor as recited in claim 2 wherein said peripheral gears of said first and second shell means are directed toward each other, and said gear means comprises a control gear disposed between each of said shell means and engaging the peripheral gears, and an idler gear on the opposite side of said shell from said control means, said idler gear being disposed between said shell means and engaging the teeth of said peripheral gears.

4. The variable speed DC motor as recited in claim 3, wherein said control means comprises a shaft coupled to the axis of said control gear and pivoted through the housing of said motor, and a lever coupled to said shaft so that said control gear can be pivoted to axially displace first and second shell means.

5. The variable speed DC motor as recited in claim 4 wherein said oppositely disposed field pole segments of said first and second shell means comprise permanent magnets.

6. The variable speed DC motor as recited in claim 5 additionally comprising rollers disposed between said first and second shell means and the housing of said motor, said rollers preventing radial displacement of said shell means with respect to the armature.

7. The variable speed DC motor as recited in claim 4 wherein said oppositely disposed field pole segments of said first and second shell means comprise wound electromagnetic field poles.

* * * * *